April 14, 1970 P. A. STAHR 3,505,900

MOTION TRANSMITTING REMOTE CONTROL ASSEMBLIES

Filed June 24, 1968

INVENTOR.
Peter A. Stahr
BY
Barnard, McGlynn Reising
ATTORNEYS

United States Patent Office 3,505,900
Patented Apr. 14, 1970

1

3,505,900
MOTION TRANSMITTING REMOTE CONTROL ASSEMBLIES
Peter A. Stahr, Pontiac, Mich., assignor to Teleflex, Incorporated, North Wales, Pa., a corporation of Delaware
Filed June 24, 1968, Ser. No. 739,395
Int. Cl. F16c 1/14, 1/16; F16l 3/22
U.S. Cl. 74—501
17 Claims

ABSTRACT OF THE DISCLOSURE

A pair of motion transmitting remote control assemblies with each including a flexible conduit with a fitting of organic polymeric material attached to one end of the conduit. A motion transmitting core element is movably disposed in the conduit and extends from the fitting. The fitting includes an opening extending therethrough as defined by a flexible lip so that the fitting may be disposed in engagement with a support structure whereby the support structure extends through the opening of the fitting. Each fitting also includes a groove and lug extending from opposite sides thereof so that the fittings of the two control assemblies can be connected together. Such fittings, when connected together, are attached to a support means comprising a plate with portions extending from opposite sides thereof to define adjacent straps with these straps being disposed in the openings of the respective fittings. The fittings are longitudinally offset from one another so as to be attached to the side by side straps of the support plate. The core elements extend along opposite faces of the support plate and are attached to control elements.

---

This invention relates to a remote control assembly of the type normally utilized to transmit motion in a curved path by a flexible motion transmitting core element.

Remote control assemblies of the type to which the instant invention pertains are relatively light weight for transmitting relatively light loads. Such assemblies are extensively utilized in automobiles for controlling a heater or to position a vent, or the like. Quite frequently the operating end of the control assembly is disposed in the instrument panel area and has a manually graspable portion which can be actuated to move the core element which is in turn connected to a control element. A conduit surrounds the core element and extends from a fitting which is normally attached to the instrument panel to a second fitting at the other end which is attached to a support structure. It will be appreciated that it is very desirable to utilize fittings on the end of the conduit which during installation are very speedily and securely attached to the support structure. In securing the fittings to a support structure the fitting should not be movable relative to the support structure.

Accordingly, it is an object and feature of this invention to provide an improved motion transmitting remote control assembly including a fitting disposed about one end of the conduit and including receiving means for snapping into engagement about a support means.

In correlation with the foregoing object and feature, another object and feature of this invention is to provide a remote control assembly wherein the receiving means includes an opening defined by a body portion of the fitting and a lip extending in a cantilevered manner from the body portion to a first end thereof which is in contact with the body portion while the length of the lip is spaced from the body portion to define the opening.

In correlation with the foregoing objects and features, it is another object and feature of this invention to provide such a fitting which includes connection means to coact with the connection means of a like fitting for attaching the two fittings together.

In correlation with the foregoing objects and features of this invention, it is another object and feature of this invention to provide such a fitting wherein the connection means comprises a groove along one side of the fitting and a lug extending from the other side whereby two such fittings may be connected together by disposing the lug of one into the groove of the other.

Another object and feature of this invention is to provide a pair of motion transmitting remote control assemblies with fittings thereof being connectable to one another and detachable from one another.

Other objects and attendant advantages of the present invention will be readily appreciated as the same becomes better understood by reference to the following detailed description when considered in connection with the accompanying drawings wherein.

Figure 1:
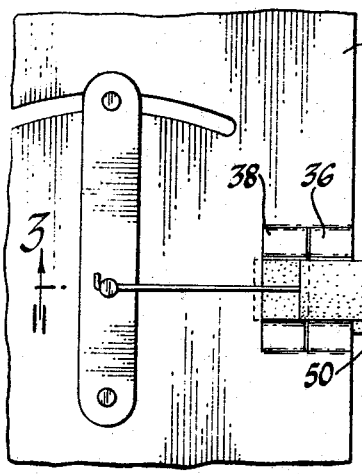
FIGURE 1 is a fragmentary view disclosing a pair of motion transmitting remote control assemblies constructed in accordance with the instant invention with the fitings thereof connected together and attached to a support means.

Referring now to the drawings, wherein like numerals indicate like or corresponding parts throughout the several views, a pair of motion transmitting remote control assemblies constructed in accordance with the instant invention are generally shown at 10. Each motion transmitting remote control assembly includes a flexible conduit 12 having first and second ends, only the first end being shown. Each control assembly includes a core element 14 movably disposed in the respective conduits 12 for transmitting motion between the ends of the conduit. As is well known in the art, the other ends of the conduits which are not shown, normally have fittings secured thereto for attaching the conduit to a support structure and the core elements 14 extend from the fitting for attachment to a control element or to a manually graspable knob. These control assemblies are of the push-pull type wherein the core elements 14 transmit tension and compression between opposite ends of the conduit. Each conduit 12 preferably includes an inner tubular member 16 of organic polymeric material with a plurality of wires 18 wrapped about the tubular member 16 on a long lead and a casing 20 of organic polymeric material disposed thereabout.

Each remote control assembly also includes a fitting generally indicated at 22 which is made of organic polymeric material and is attached to the end of the conduit 12. Each fitting 22 includes a receiving means for snapping into engagement about a support means 24. The receiving means includes an opening 26 which extends through each fitting 22 for being disposed about a support means. More specifically, the opening 26 is defined by a body portion 28 and a lip 30. The lip 30 extends from the body portion in a cantilevered fashion and is spaced from the body portion 28 along the length thereof to define the opening 26. The first end 32 of the lip 30 engages the body portion 28 in that both the lip 30 and the body portion 28 includes a section thereof extending into engagement with the like section on the other. The lip 30 is flexible relative the body portion 28 for moving away from the body portion 28 to allow a support means to be disposed in the opening 26. It will be noted that the lip 30 is tapered along the exterior thereof so as to allow the lip 30 to be more flexible towards the first end 32 thereof. This taper also allows the movement of the lip 30 downward toward the adjacent fitting. Also, the first end 32 of the lip 30 and the body portion adjacent thereto is beveled, as indicated at 34 in FIGURE 3, to facilitate the insertion and disposition of a support means in the opening 26. It will be noted that the openings 26 are rectangular in cross section.

The support means 24 comprises a plate with portions thereof extending from opposite sides thereof to define adjacent straps 36 and 38. The straps 36 and 38 are generally rectangular in cross sectional configuration and are snugly disposed in the receptive openings 26 of the fittings 22 whereby twisting movement of the fittings 22 is resisted.

Pivotally secured to the support plate are the control elements 40. The core elements 14 extend respectively from the fittings 22 along opposite faces of the support plate and are attached to the respective control elements 40. It is to be understood that the term control element, as used in this description, may mean an element which is moved or controlled upon movement of the core element or an element which moves the core element. Each fitting includes a bore 42 extending therethrough and the core elements 14 extend out of the conduits 12 and through the bores 42.

Figure 2:
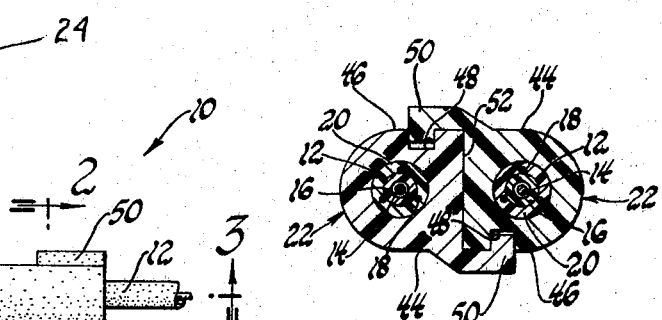
FIGURE 2 is an enlarged cross sectional view taken substantially along line 2—2 of FIGURE 1.
Figure 3:
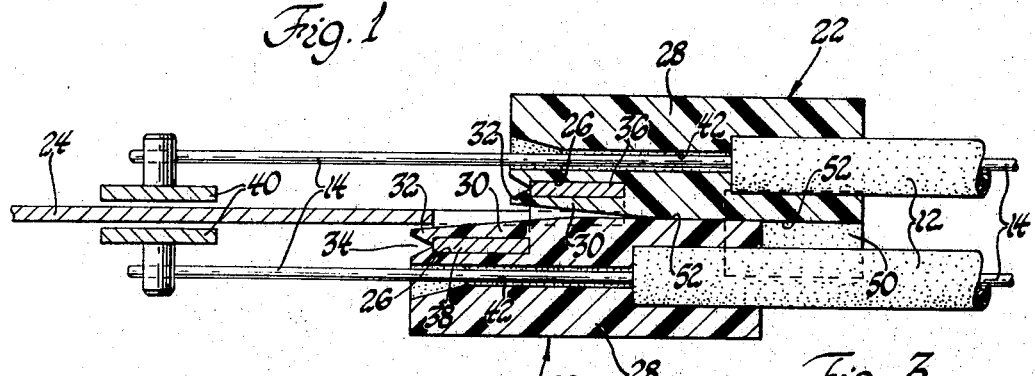
FIGURE 3 is an enlarged cross sectional view taken substantially along line 3—3 of FIGURE 1.
Figure 4:
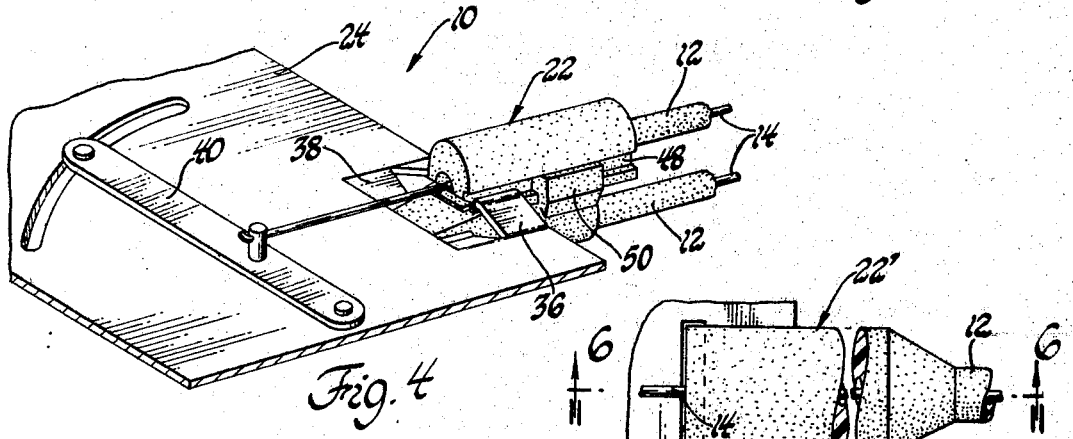
FIGURE 4 is a perspective view of the assembly shown in FIGURE 1.

In order to further increase the stability of the system so that the fittings are not movable relative to the support plate, each fitting 22 includes connection means to coact with a like fitting for attaching the two fittings together. More specifically, each fitting has opposite sides 44 and 46, as illustrated in FIGURE 2, and the connection means comprises a groove 48 extending along the side 46 and a lug 50 extending from the side 44 whereby the two fittings may be connected together by disposing the lug of each fitting into the groove of the other fitting. Each fitting has a generally plane surface 52 which extends between the sides 44 and 46 thereof. Each lug 50 is disposed outwardly of the surface 52 and the plane surfaces 52 of a pair of fittings are in contact with one another when the fittings are connected together by the lugs and grooves as illustrated in FIGURES 2 and 3.

The fittings 22 are longitudinally offset from one another so that the openings 26 thereof are in offset relationship from one another. In such a manner, the side by side straps 36 and 38 may be disposed in the openings 26 of the fittings 22. The interconnection of the two fittings 22 by the grooves 48 and the lugs 50 greatly increases the forces necessary to move the two fittings relative to the support plate; thus, providing a secure attachment of the fittings to the support plate.

Figure 5:
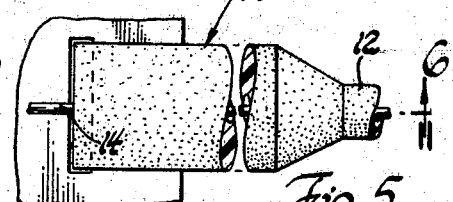
FIGURE 5 is a fragmentary view of an alternative embodiment of the fitting of the instant invention secured to a support means.
Figure 6:
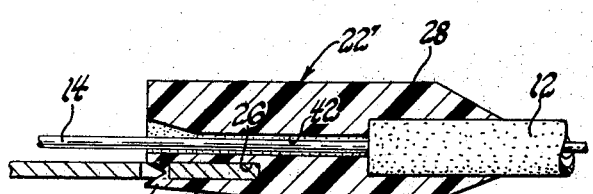
FIGURE 6 is a fragmentary cross sectional view taken substantially along line 6—6 of FIGURE 5.

The embodiment generally indicated at 22′ in FIGURES 5 and 6 is the same as the fittings 22 except for the fact that it does not incorporate the grooves 48 and lugs 50. In other words, the embodiment illustrated in FIGURES 5 and 6 cannot be connected to another like fitting.

The fittings 22 and 22′ are preferably made of organic polymeric material.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A motion transmitting remote control assembly comprising: a flexible conduit having first and second ends, a fitting of organic polymeric material attached to one end of said conduit, and a core element movably disposed in said conduit for transmitting motion between said ends of the conduit, said fitting including receiving means for snapping into engagement about a support means, said receiving means including an opening extending through said fitting for being disposed about a support means, said opening being defined by a body portion of said fitting and a lip extending from said body portion to a first end thereof, said lip being disposed to extend from said body portion in a cantilevered fashion and spaced from said body portion along the length thereof to define said opening.

2. A motion transmitting remote control assembly as set forth in claim 1 wherein said first end of said lip engages said body portion.

3. A motion transmitting remote control assembly as set forth in claim 2 wherein said lip is flexible relative to said body portion for moving away from said body portion to allow a support means to be disposed in said opening.

4. A motion transmitting remote control assembly as set forth in claim 3 wherein at least one of said first end of said lip and said body portion adjacent thereto is beveled to facilitate the disposition of a support means in said opening.

5. A motion transmitting remote control assembly as set forth in claim 4 wherein said opening is rectangular in cross section.

6. A motion transmitting remote control assembly as set forth in claim 5 wherein said fitting includes a bore extending therethrough and said core element extends from said conduit and through said bore.

7. A motion transmitting remote control assembly as set forth in claim 4 wherein said fitting includes connection means to coact with a like fitting for attaching the fittings together.

8. A moion transmitting remote conrol assembly as set forth in claim 7 wherein said fitting has opposite sides and said connection means comprises a groove extending along one side and a lug extending from the other side whereby two such fittings may be connected together by disposing the lug of each fitting into the groove of the other fitting.

9. A motion transmitting remote control assembly as set forth in claim 8 wherein said fitting has a generally plane surface extending between said sides thereof, said lug being disposed outwardly of said surface whereby the plane surfaces of a pair of such fittings are in contact with one another when the fittings are connected togeher by the lugs and grooves thereof.

10. A motion transmitting remote control assembly as set forth in claim 9 and including a second such motion transmitting remote control assembly with a second such fitting, said fittings being connected together by the lug of each fitting being disposed in the groove of the other, said fittings being offset from one aonther so that the openings thereof are offset from one another.

11. A motion transmitting remote control assembly as set forth in claim 10 including a support means comprising a plate with portions thereof extending from opposite sides thereof to define adjacent straps, one of said straps being disposed in said opening of one of said fittings and the other strap being disposed in said opening of the other fitting, core elements extending respectively from said fittings and are attached to respective control elements.

12. A motion transmitting remote control assembly comprising: a flexible conduit having first and second ends, a fitting of organic polymeric material attached to one end of said conduit, and a core element movably disposed in said conduit for transmitting motion between said ends of the conduit, said fitting including receiving means for snapping into engagement about a support means, said fitting including connection means to coact with a second fitting for attaching the fittings together.

13. A motion transmitting remote control assembly as set forth in claim 12 wherein said fitting has opposite sides and said connection comprises a groove extending along one side and a lug extending from the other side whereby two such fittings may be connected together by disposing the lug of each fitting into the groove of the other fitting.

14. A motion transmitting remote control assembly as set forth in claim 13 wherein said fitting has a generally plane surface extending between said sides thereof, said lug being disposed outwardly of said surface whereby the plane surfaces of a pair of such fittings are in contact with one another when the fittings are connected together by the lugs and grooves thereof.

15. A pair of motion transmitting remote control assemblies with each comprising; a flexible conduit having a first and second ends, a fitting attached to the first end of said conduit, a core element movably disposed in said conduit for transmitting motion between the ends thereof, the fittings being connected together and being detachable from one another, said fittings being identical and include connection means for attaching said fittings together, each fitting having opposite sides and said connection means comprises a groove extending along one side of each fitting and a lug extending from the other side of each fitting, the lug of each fitting being disposed in the groove of the other fitting.

16. A motion transmitting remote control assembly as set forth in claim 15 wherein each fitting has a plane surface extending between the sides thereof, said lugs being disposed outwardly of said surface, said surfaces of said fittings being in contact with one another.

17. A motion transmitting remote control assembly as set forth in claim 16 wherein each of said fittings includes means for attachment to a support means.

References Cited

UNITED STATES PATENTS

| 1,450,284 | 4/1923 | Goldschmidt | 64—3 X |
| 2,893,221 | 7/1959 | Bell | 64—4 |
| 3,116,646 | 1/1964 | Seckerson | 74—501 |
| 3,225,621 | 12/1965 | Augunas | 74—501 |
| 3,235,209 | 2/1966 | Seckerson et al. | 248—73 |
| 3,253,084 | 5/1966 | Taylor | 248—73 |

FOREIGN PATENTS 884,593  12/1961  Great Britain.

JAMES A. WONG, Primary Examiner

U.S. Cl. X.R.

248—68, 73